G. M. GOUDY.
COMBINED WHEELED CARRIAGE AND SLED.
APPLICATION FILED JAN. 27, 1916.
1,188,930.
Patented June 27, 1916.
2 SHEETS—SHEET 1.
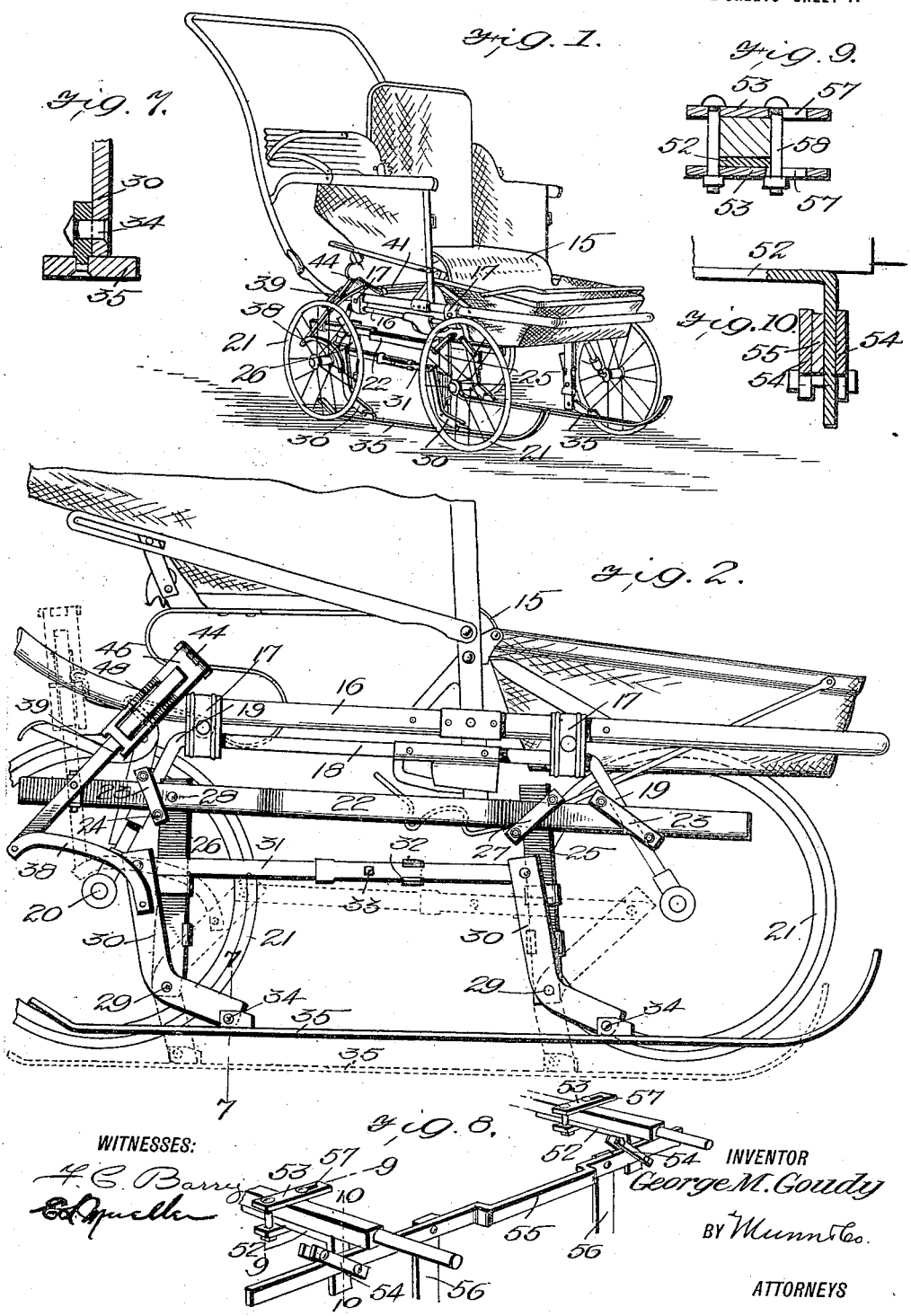

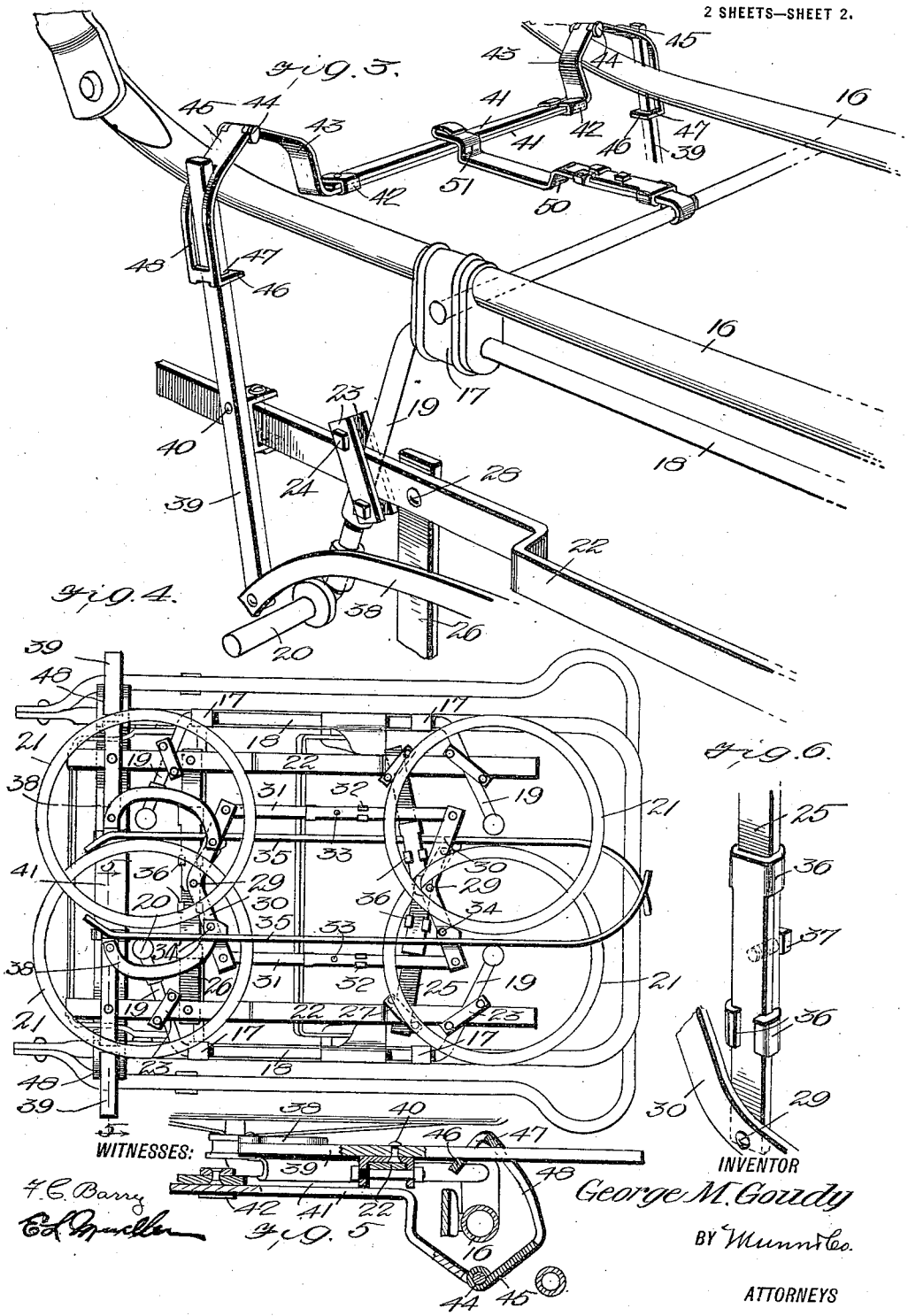

UNITED STATES PATENT OFFICE.

GEORGE M. GOUDY, OF GOSHEN, INDIANA.

COMBINED WHEELED CARRIAGE AND SLED.

1,188,930.  Specification of Letters Patent.  Patented June 27, 1916.

Application filed January 27, 1916. Serial No. 74,721.

*To all whom it may concern:*

Be it known that I, GEORGE M. GOUDY, a citizen of the United States, and a resident of Goshen, in the county of Elkhart and State of Indiana, have invented an Improvement in Combined Wheeled Carriages and Sleds, of which the following is a specification.

This invention is an improvement in vehicles and has particular reference to a combined wheeled carriage and sled.

An object of the invention is the provision of a pair of runners or shoes for a wheeled carriage of any construction to which is connected novel mechanism for lowering the runners into engagement with the ground when it is desired to employ the vehicle as a sled and raising the same out of contact therewith when the wheels are used as the supporting medium.

Another object resides in the compact arrangement of the mechanism for raising and lowering the runners or shoes and the adjustability thereof whereby the same may be readily applied to foldable or collapsible vehicles of different sizes and will not interfere with the folding of the vehicle whenever desired.

The inventive idea involved is capable of receiving a variety of mechanical expressions, some of which, for the purpose of illustrating the invention, are shown in the accompanying drawings, in which—

Figure 1 is a perspective view of a foldable baby carriage showing the invention applied thereto, the runners or shoes being raised from contact with the ground. Fig. 2 is an enlarged side elevation of the raising and lowering mechanism, the dotted lines showing the position of the parts when the runners are in contact with the ground. Fig. 3 is an enlarged fragmentary perspective view of a portion of the frame of the vehicle showing the operating mechanism for raising and lowering the runners, the parts being shown in the position assumed when the runners are in contact with the ground. Fig. 4 is a bottom plan view of the vehicle and runner mechanism in folded or collapsed position. Fig. 5 is a section on the line 5—5 of Fig. 4. Fig. 6 is a perspective view of a detail. Fig. 7 is a section on the line 7—7 of Fig. 2. Fig. 8 is a fragmentary perspective view of a runner supporting mechanism particularly adapted for use on vehicles of rigid or non-collapsible construction. Fig. 9 is a section on the line 9—9 of Fig. 8. Fig. 10 is a section on the line 10—10 of Fig. 8.

Referring to the drawings and more particularly to Figs. 1 to 7 inclusive the invention is illustrated in connection with a foldable or collapsible baby carriage generally indicated by the numeral 15 and consisting of a frame including side bars 16 having suitable bearings 17 secured thereto in which are mounted the axle members 18 the greater portion of which extends longitudinally of the frame, each end of said axle members being bent to provide the extensions 19 the extremities 20 of which are designed to have the wheels 21 of the vehicle mounted thereon. These axle members 18 are pivotally mounted in the bearings 17 so that the same, together with the runners or shoes presently to be described, may be swung to the folded position as shown in Fig. 4 of the drawings. The construction which has thus far been described is only employed in connection with a foldable baby carriage of a standard make, the principal features of the invention being embodied in the runners or shoes and the mechanism for supporting and operating the same which will now be described.

Referring particularly to Figs. 2 and 3 it will be seen that the runner supporting frame consists of a horizontally arranged supporting member or bar 22 which is secured adjacent each end to the extensions 19 of the axle members 18 by means of plates 23 secured together by means of bolts 24. The runner supporting frame also includes front and rear vertical bars or arms 25 and 26 respectively, the former being secured to the horizontal member 22 by means of plates 27 similar to plates 23 while the rear bar 26 is riveted to the member 22 as indicated at 28. The lower end of each of the arms 25 and 26 has pivoted thereto at 29 a rocking lever 30, the upper ends of said levers being secured together by a link connection 31 consisting of a pair of bars having formed at their free ends coöperating lugs 32 adapted to engage the other bar whereby said link connection is rendered adjustable, the bars being held in their adjusted positions by means of a set screw or other suitable fastener 33. The lower ends of the levers 30 have pivoted thereto at 34 the runners or shoes 35, the parts being so positioned that when the runners are in contact with the ground the squared ends of the levers 30 will have a flush engagement with the top of the runners whereby the latter will be properly braced, as best illustrated in Fig. 7. The vertical bars or arms 25 and 26 are both made adjustable in length by providing the ends of the members comprising said arms with guide lugs 36 similar to the lugs 32 and adapted to engage the other member of the bar whereby a relative sliding adjustment is obtained. The parts are secured in adjusted position by means of a set screw 37.

From the foregoing description it will be apparent that the runner supporting frame may be readily and quickly detached, if desired, by simply removing the fastening plates 23.

The mechanism operating the movable parts 30 and 31 to raise and lower the runners 35 includes a substantially arcuate connecting member 38 having one end pivoted to each of the rear levers 30 adjacent its end, the other end of each member 38 being secured to one end of an oscillating lever 39 pivoted to the horizontal supporting member 22 at 40, said connecting member 38 extending over the axle 20. As these oscillating levers 39 are operated, in a manner to be presently described, the connecting members 38 will cause the levers 30 to rock about their pivots 29 to the dotted line position as shown in Fig. 2, when it is desired to lower the runners into contact with the ground, and cause the latter to move downwardly and rearwardly. By reversing the movement of the oscillating levers 39, the runners 35 will move upwardly and forwardly to the full line position shown in the same figure.

The device for operating the levers 39 consists of a pair of complemental bars 41 adjustable relative to each other and extending transversely relative to the side members 16 of the vehicle frame at the rear thereof. Each bar 41 is provided at its inner end with lugs 42 adapted to embrace the other bar whereby the same are secured together and rendered relatively adjustable. The outer end of each bar is provided with an upwardly curved extension 43 to the extremity of which is hinged at 44 an oscillating lever engaging a guiding member 45 in the form of a downwardly curved arm provided at its lower end with an inward extension 46 having an opening 47 adapted to receive the oscillating lever 39. The main portion of member 45 is also provided with an elongated slot 48 for receiving said oscillating lever, the extremity of which projects through said slot as best shown in Fig. 3 so that when the operating device is actuated to operate the lever 39 the contact of the member 45 therewith will shift the same to the desired position and at the same time will permit of a slight relative longitudinal movement between said lever and said member 45. The purpose of forming the extensions 43 and members 45 and hinging the same together, as shown in Fig. 3, is to permit of the parts assuming a complete folded or collapsed position as shown in Fig. 4, in which position the elements just described will partially encircle the side members 16 of the vehicle frame as illustrated in Fig. 5.

A suitable device is employed in connection with the invention for retaining the operating device in its adjusted positions and consists of an arm 49 in the form of a bar and comprising two parts adjustable relative to each other to vary the length of said element. One end of the latter is pivoted to a transverse portion of the frame of the vehicle and is also provided intermediate its ends with an offset portion for forming stops 50 and 51, the former engaging the bars 41 when the runners are in their raised positions while the stop 51 engages said bars when the runners are lowered, as shown in Fig. 3. When it is desired to adjust the runners it is only necessary to raise the free end of the retaining element so that the stops will be disengaged from the bars 41 whereupon the latter may be moved, by the foot of the operator, to either of the adjusted positions.

The form of the invention illustrated in Figs. 8 to 10 inclusive is particularly adapted for use in connection with a rigid or non-collapsible vehicle frame and consists of L-shaped members 52 secured to the axles of the vehicle by means of suitable clamping plates 53, the short arms of said members 52 having fastened thereto by means of similar clamping plates 54 the horizontal member 55 of the supporting frame. The latter also includes the vertical depending arms 56 to which are secured the movable parts including the runners. The clamping plates 53 are preferably provided with elongated slots 57 for receiving one of the clamping bolts 58 whereby any width of axle may be accommodated between the bolts which secure said plates together.

What is claimed is:

1. In a vehicle, the combination of a wheeled frame including axle members, a runner supporting frame detachably connected to said axle members, the latter frame including vertical adjustable elements, levers pivoted intermediate their ends to said vertically adjustable elements, runners pivoted to the lower ends of said levers, said ends being adapted to flush engagement with the top of said runners when the latter are in engagement with the ground, an adjustable connection between said levers, and means for rocking said levers about their pivots whereby to raise and lower said runners.

2. In a vehicle, the combination of a wheeled frame including axle members, a runner supporting frame detachably connected to said axle members, the latter frame including vertically adjustable elements, levers pivoted intermediate their ends to said vertically adjustable elements, runners pivoted to the lower ends of said levers, said ends being adapted for flush engagement with the top of said runners when the latter are in engagement with the ground, an adjustable connection between said levers, and means including an oscillating lever pivoted to said runner supporting frame for rocking the first-named levers about their pivots to raise and lower said runners.

3. In a vehicle, the combination of a wheeled frame including axle members, a runner supporting frame detachably connected to said axle members, the latter frame including vertically adjustable elements, levers pivoted intermediate their ends to said vertically adjustable elements, runners pivoted to the lower ends of said levers, said ends being adapted for flush engagement with the top of said runners when the latter are in engagement with the ground, an adjustable connection between said levers, and oscillatory means connected to said levers for rocking the same about their pivots to raise and lower said runners.

4. In a vehicle, the combination of a wheeled frame including axle members, a runner supporting frame detachably connected to said axle members, the latter frame including vertically adjustable elements, levers pivoted intermediate their ends to said vertically adjustable elements, runners pivoted to the lower ends of said levers, said ends being adapted for flush engagement with the top of said runners when the latter are in engagement with the ground, an adjustable connection between said levers, an oscillating lever pivoted to said runner supporting frame, a connection between one end of the last-named lever and one of the first-named levers, a device for actuating said oscillating lever and including relatively adjustable elements extending transversely of the vehicle frame, and a curved arm pivoted to one of said relatively adjustable elements and having an elongated slot therein, said curved arm being also provided with an inwardly extending extremity having an opening therein, said slot and opening being adapted to receive said oscillating lever.

5. In a vehicle, the combination of a wheeled frame including axle members, a runner supporting frame detachably connected to said axle members, the latter frame including vertically adjustable elements, levers pivoted intermediate their ends to said vertically adjustable elements, runners pivoted to the lower ends of said levers, said ends being adapted for flush engagement with the top of said runners when the latter are in engagement with the ground, an adjustable connection between said levers, an oscillating lever pivoted to said runner supporting frame, a connection between one end of the last-named lever and one of the first-named levers, a device for actuating said oscillating lever and including relatively adjustable elements extending transversely of the vehicle frame, a curved arm pivoted to one of said relatively adjustable elements and having an elongated slot therein, said curved arm being also provided with an inwardly extending extremity having an opening therein, said slot and opening being adapted to receive said oscillating lever, and an adjustable retaining device pivoted at one end to a portion of the wheeled frame and engaging said relatively adjustable elements for securing said actuating device in its adjusted positions.

6. In a vehicle, the combination of a foldable wheeled frame including pivoted axle members, runner supporting frames detachably secured to said axle members, rocking levers pivoted to said runner supporting frames, runners pivoted to said levers, and means for rocking said levers about their pivots to lower said runners in a rearwardly and downwardly extending direction and raise the same in a forwardly and upwardly extending direction.

7. In a vehicle, the combination of a foldable wheeled frame including pivoted axle members, runner supporting frames detachably secured to said axle members, rocking levers pivoted to said runner supporting frames, runners pivoted to said levers, oscillatory means for lowering said runners in a rearwardly and downwardly extending direction and raising the same in a forwardly and upwardly extending direction, and a retaining device for securing said oscillatory means in its adjusted positions.

8. In a vehicle, the combination of a foldable wheeled frame, runner supporting frames secured thereto, runners carried by said frames, oscillatory means connected to said runners for raising and lowering the same, an operating device for said oscillatory means including relatively adjustable elements extending transversely of the wheeled frame, and a curved arm pivoted to each of said elements and having an inwardly extending extremity, said arm having an elongated slot and said extremity having an opening for receiving said oscillatory means.

9. In a vehicle, the combination of a foldable wheeled frame, runner supporting frames secured thereto, runners carried by said frames, oscillatory means connected to said runners for raising and lowering the same, an operating device for said oscillatory means including relatively adjustable elements extending transversely of the wheeled frame, a curved arm pivoted to each of said elements and having an inwardly extending extremity, said arm having an elongated slot and said extremity having an opening for receiving said oscillatory means, and a retaining device pivoted to said wheeled frame, and engaging said relatively adjustable elements for securing said operating device in its adjusted positions.

10. In a vehicle, the combination of a frame including pivoted axle members foldable beneath said frame, supporting frames carried by said axle members, runners associated with said frames, means pivoted to said frames and said runners for supporting the latter, and an operating device extending transversely of the wheeled frame and connected to said runner supporting means for actuating the latter to raise and lower said runners.

11. In a vehicle, the combination of a frame including pivoted axle members foldable beneath said frame, supporting frames carried by said axle members, runners associated with said frames, means pivoted to said frames and said runners for supporting the latter, and an operating device including relatively adjustable elements extending transversely of said wheeled frame for adjusting said runner supporting means to raise and lower the runners.

12. In a vehicle, the combination of a frame including pivoted axle members foldable beneath said frame, supporting frames carried by said axle members, runners associated with said frames, means pivoted to said frames and said runners for supporting the latter, an operating device including relatively adjustable elements extending transversely of said wheeled frame for adjusting said runner supporting means to raise and lower the runners, and means for maintaining said operating device in its adjusted positions.

GEORGE M. GOUDY.

Copies of this patent may be obtained for five cents each, by addressing the "Commissioner of Patents Washington, D. C."